UNITED STATES PATENT OFFICE.

CARLETON ELLIS, OF MONTCLAIR, NEW JERSEY.

PROCESS OF MAKING CATALYZERS.

1,092,206.   Specification of Letters Patent.   Patented Apr. 7, 1914.

No Drawing.   Application filed August 30, 1913.   Serial No. 787,545.

*To all whom it may concern:*

Be it known that I, CARLETON ELLIS, a citizen of the United States, and a resident of Montclair, in the county of Essex and State of New Jersey, have invented certain new and useful Improvements in Processes of Making Catalyzers, of which the following is a specification.

This invention relates to catalytic material and process of making same and relates particularly to metallic or metalliferous material in a finely divided condition, especially nickel material which as the preferred embodiment hereof will be hereinafter specifically described as illustrative of the present invention.

The preparation of finely divided nickel for catalytic purposes as heretofore practised usually involves a lengthy and costly procedure. The metal is dissolved in an acid to form a salt solution, a porous carrier is impregrated with the solution, a precipitating agent such as an alkali is added, the composition washed thoroughly, dried, ignited and reduced.

To be effective catalytically the nickel material should be in a very finely divided or extended condition which the foregoing procedure accomplishes more or less satisfactorily at times, but always there exists the danger of introduction at some stage or another of traces or quantities of bodies such as chlorin, sulfur and the like which are injurious to catalyzers, weakening or destroying their efficiency and hence much variation appears in the quantity of catalyzer even when prepared from day to day under supposedly uniform conditions.

By the present invention not only may these troublesome preliminary operations be dispensed with, but also danger from contamination by catalyzer poisons is satisfactorily avoided.

My invention in its preferred form involves the utilization of the disintegrating effect of an electrical current or arc between a pole or poles of nickel preferably immersed in a vehicle offering considerable resistance to the electric current such as water, aqueous solutions, organic compounds as hydrocarbon oils, salts in a molten condition and the like, thereby producing nickel material in a finely divided condition often requiring little or no further treatment to serve as a catalyzer. When water or aqueous solutions of oxidizing salts are used an oxidizing effect is secured under some circumstances, while with many organic compounds the metal or metal and carbon mixtures may form. The fused salts enable oxidizing, neutral or reducing or other conditions to be maintained according to the salt selected.

As an illustrative example of the invention, two electrodes of pure nickel in bar or rod form are connected one to the positive and the other to the negative pole of a source of electricity. The ends of the nickel rods are dipped in water and brought in contact, then separated so as to form an arc under the water. This results in the production of nickel material usually of a brown to blackish color in a state of more or less fine division, some of this material often being so fine and flocculent as to remain suspended in water for several days. Distilled water should preferably be used though under some circumstances saline solutions may be employed. By the use of distilled water the introduction of contaminating bodies is practically or entirely avoided.

Regulation of the arc is desirable in order to avoid melting away particles of nickel in the shape of large fragments which are not useful for the present purpose, although there is always some coarse material formed in this manner under the ordinary method of procedure which can, however, be avoided by certain means. When the product contains such heavy nickel particles the product may be levigated and the lighter sludge separated from the heavy nickel residue. The sludge is evaporated to dryness when a very light nickel material is obtained, which may be used at once as a catalytic body or may first be reduced in hydrogen or other reducing material. Or, the wet sludge may be heated with oil to expel the water in order to produce a form of nickel which remains suspended in oil for a long period and this may be used as catalytic basis. In such a case it is usually well to heat to 230–250° C. in the early stage of the hydrogenation treatment and after a time the temperature may be reduced to 200° and lower.

The present method yields a product which is effective catalytically and is so extended that no carrier is necessarily required although the use of a carrier is in no wise prohibited, but is not recommended ordinarily as the nickel is used and recovered to better advantage when not adulterated with a large amount of inert material.

Nickel when treated in the foregoing manner using distilled water does not form a colloidal solution to any extent, but simply divides into highly flocculent pulverulent precipitate.

The voltage of the current employed should be regulated in respect to the size of the arc and vehicle in which this is formed. The amperage is regulated with respect to the quantity of nickel to be converted. With the ordinary lighting current of A. C. 110 volts, I have been able to produce finely divided nickel material of a satisfactory character and without excessive current consumption provided that the proper gap between electrodes is constantly maintained.

By my invention nickel material may be produced either in a metallic, oxidized condition or otherwise which is of peculiar construction besides being of a flaky and voluminous character. It will be found when examined under the microscope using high magnification especially with dark ground illuminator a web like formation of matter is present somewhat resembling tissue in plants or animals permeated more or less with pores or canals and in many instances resembling the appearance of the thin sections of portions of animal or vegetable living tissue.

My invention is not limited to the illustrative nickel material herein, but comprises cobalt and the like including all material of an equivalent character properly falling within the scope of this invention.

Reference is made here to the work of Bredig who prepared colloidal solutions of platinum and certain other metals by means of an electric arc between two poles of the metal under water or very dilute alkali. He thus obtained aqueous colloidal solutions of platinum and the like and I do not lay claim herein to such aqueous mixtures, as these, especially for the purpose of hardening fatty oils, are not well adapted owing to the tendency of the water present to cause hydrolysis of glycerids into free fatty acids and glycerin, thereby endangering the fatty material or changing its composition or flavor.

The present process is primarily directed toward the production of a finely divided nickel precipitate which may be readily removed by filtration and the production of any colloidal nickel or other metal employed for this purpose is merely incidental if produced at all. In general it may be stated that by using the nickel in the form of rods or bars of suitable thickness, the formation of a nickel precipitate of this finely divided substantially non-colloidal character may be secured. If by chance or by purpose any colloidal nickel is formed during the operation the metal so converted is not retained readily by the filter and in order to recover nickel in this form the colloidal solution would have to be treated with some coagulant.

What I claim is:

1. The process of producing catalytic material adapted for use in the hardening of fatty oils which comprises forming an arc between electrodes comprising nickel material and in the presence of a liquid medium, and in collecting the finely divided nickel-containing precipitate resulting from the eroding action of such arc.

2. The process of producing catalytic material adapted for use in hardening fatty oils which comprises passing an electric current of arc-forming strength between electrodes comprising nickel material and in the presence of a liquid medium and in collecting the finely divided nickel-containing precipitate resulting from the eroding action of said electric current.

3. The process of producing catalytic material adapted for use in the hardening of fatty oils which comprises subjecting a thick mass of nickel as an electrode to the action of an electric arc and in the presence of a liquid medium; whereby nickel of a substantially-colloidal form is obtained, and in collecting the precipitate resulting from the eroding action of such arc.

4. The process of producing catalytic material which comprises forming an arc between nickel electrodes in the presence of water and in collecting the finely divided nickel containing precipitate resulting from the eroding action of such arc.

5. The process of producing catalytic material which comprises forming an arc between nickel electrodes in the presence of distilled water and in collecting the finely divided nickel containing precipitate resulting from the eroding action of such arc.

6. The process of producing catalytic material which comprises forming an arc between nickel electrodes in the presence of a liquid medium and in collecting the finely divided nickel containing material resulting from the eroding action of such arc, in heating the wet nickel material with oil to expel water and produce an oil base containing nickel material.

Signed at Montclair in the county of Essex and State of New Jersey this 27th day of August A. D. 1913.

CARLETON ELLIS.

Witnesses:
B. M. ELLIS,
F. CANBUTT.